United States Patent [19]

Ako

[11] Patent Number: 4,902,947
[45] Date of Patent: Feb. 20, 1990

[54] SERVO CIRCUIT WITH FAILURE DETECTION MECHANISM

[75] Inventor: Hidenobu Ako, Ogaki, Japan

[73] Assignee: Teijin Seiki Company Limited, Osaka, Japan

[21] Appl. No.: 296,142

[22] Filed: Jan. 12, 1989

[30] Foreign Application Priority Data

Jan. 20, 1988 [JP] Japan .................... 63-10512

[51] Int. Cl.⁴ ............................... G05B 9/02
[52] U.S. Cl. .................... 318/563; 318/564; 318/561; 91/363 A
[58] Field of Search .............. 318/563, 564, 561; 91/363 A

[56] References Cited

U.S. PATENT DOCUMENTS

| 4,159,444 | 6/1979 | Bartlett et al. | 318/564 |
| 4,345,191 | 8/1982 | Takata et al. | 318/564 |
| 4,398,242 | 8/1983 | Buus | 91/363 A |
| 4,436,018 | 3/1984 | Murphy et al. | 91/363 A |
| 4,629,954 | 12/1986 | Bonzai et al. | 318/561 |
| 4,829,220 | 5/1989 | Fabre | 318/563 X |

Primary Examiner—William M. Shoop, Jr.
Assistant Examiner—Saul M. Bergmann
Attorney, Agent, or Firm—Lane & Aitken

[57] ABSTRACT

A servo circuit with a failure detection mechanism comprising: a servo circuit for servo controlling on the basis of a control signal an actuator which is connected through a hydraulic circuit with a source of oil pressure and is operated by the hydraulic circuit which is changed over by a servo valve; a monitor circuit arranged in parallel relationship with the servo circuit and generating a monitor control signal; and a failure detection circuit in which the control signal of the servo circuit and the monitor control signal of the monitor circuit are inputted and which detects a failure of the servo circuit on the basis of the control signal and the monitor control signal; wherein the hydraulic circuit is provided with pressure detecting means for detecting a pressure thereof; and the monitor circuit includes a correction circuit in which a pressure signal from the pressure detecting means is inputted and which corrects a loop gain of the monitor circuit in correspondence with a value of the pressure signal.

4 Claims, 2 Drawing Sheets

SERVO CIRCUIT WITH FAILURE DETECTION MECHANISM

FIELD OF THE INVENTION

The present invention relates to a servo circuit with a failure detection mechanism.

DESCRIPTION OF THE PRIOR ART

A generally known servo circuit with a failure detection mechanism is, for example, such as shown in FIG. 2. The servo circuit comprises a servo circuit 5 for servo controlling an actuator 4 which includes an adder 1, a servo valve 2 and a detector 3, a monitor circuit 8 which is arranged in parallel relationship to the servo circuit 5 and includes a monitor adder 6 and a substitute circuit 7 which substituted a unitary electric circuit for the components of the servo circuit 5, and a failure detection circuit 9 for detecting a failure of the servo circuit 5 by comparing a control signal a from the adder 1 of the servo circuit 5 and a monitor control signal b from the monitor adder 6 of the monitor circuit 8. In the aforesaid conventional servo circuit, it is judged that the servo circuit 5 has failed, if the components of the servo circuit 5, for example, the servo valve 2, detector 3 and the like failed and the comparison result in the failure detection circuit 9 becomes more than a constant value (allowable value), and furthermore if this condition continues more than a constant time.

However, in the servo circuit with a failure detection mechanism of the above type, the pressure in a hydraulic circuit 10 fluctuates which operates the actuator 4. If, for example, the internal pressure in a passage 11 of the hydraulic circuit 10 between a source of oil pressure (not shown) and the servo valve 2 changes, or if the difference of internal pressure occurs between the passages 12 and 13 of the hydraulic circuit 10 between the servo valve 2 and the actuator 4, the transfer function of the servo valve 2 changes correspondingly. This change causes the loop gain of the servo circuit 5 to fluctuate, but the loop gain of the monitor circuit 8 remains constant regardless of the pressure fluctuation in the hydraulic circuit 10, since the loop gain of the substitute circuit 7 is a constant value. For this reason, if the aforementioned pressure fluctuation occurs, the difference of the loop gain occurs between the servo circuit 5 and the monitor circuit 8 and therefore a difference occurs between the aforesaid control signal a and monitor control signal b. Consequently, there is the drawback that, in the case the aforementioned pressure fluctuation is large, the difference between the control signal a and the monitor control signal b becomes more than a constant value and it is judged in error that the servo circuit 5 has failed. In order to prevent such a mistaken judgement, if the aforementioned constant value is set to a larger value, there is another drawback that the sensibility of failure detection will be reduced.

It is accordingly an object of this invention to provide an improved servo circuit with a failure detection mechanism which is capable of detecting a failure of the servo circuit with high sensibility and of eliminating a mistaken detection even if there are pressure fluctuations in the hydraulic circuit of the servo circuit.

SUMMARY OF THE INVENTION

The foregoing object is accomplished in accordance with the present invention by providing a servo circuit with a failure detection mechanism comprising: a servo circuit for servo controlling on the basis of a control signal an actuator which is connected through a hydraulic circuit with a source of oil pressure and is operated by the hydraulic circuit which is changed over by a servo valve; a monitor circuit arranged in parallel relationship with the servo circuit and generating a monitor control signal; and a failure detection circuit in which the control signal of the servo circuit and the monitor control signal of the monitor circuit are inputted and which detects a failure of the servo circuit on the basis of the control signal and the monitor control signal; wherein the hydraulic circuit is provided with pressure detecting means for detecting a pressure thereof; and the monitor circuit includes a correction circuit in which a pressure signal from the pressure detecting means is inputted and which corrects a loop gain of the monitor circuit in correspondence with a value of the pressure signal.

The foregoing object is also accomplished in accordance with the present invention by providing a servo circuit with a failure detection mechanism comprising: a servo circuit including an adder in which a target signal is inputted, a servo valve provided in a hydraulic circuit, an actuator which is connected through the hydraulic circuit with a source of oil pressure and is operated by the hydraulic circuit which is changed over by the servo valve, and a detector which detects the operation of the actuator and transmit a feedback signal to the adder, the adder transmitting a control signal to the servo valve on basis of the target signal and the feedback signal; a monitor circuit arranged in parallel relationship with the servo circuit and including a monitor adder in which the target signal is inputted, and a substitute circuit having a transfer function of a constant value which composited transfer functions of the servo valve, actuator and detector of the servo circuit, the monitor adder generating a monitor control signal on the basis of the target signal and a monitor feedback signal from the substitute circuit; and a failure detection circuit in which the control signal of the servo circuit and the monitor control signal of the monitor circuit are inputted and which detects a failure of the servo circuit on the basis of the control signal and the monitor control signal; wherein the hydraulic circuit is provided with pressure detecting means for detecting a pressure thereof; and the monitor circuit includes a correction circuit in which a pressure signal from the pressure detecting means is inputted and which corrects a loop gain of the monitor circuit in correspondence with a value of the pressure signal.

The pressure detecting means may comprise a first pressure detector provided in the hydraulic circuit between the servo valve and the source of oil pressure and a second pressure detector provided in the hydraulic circuit between the servo valve and the actuator.

The correction circuit may be provided between the monitor adder and the substitute circuit, and wherein the adder, correction circuit and substitute circuit are arranged in series so as to form a closed loop.

BRIEF DESCRIPTION OF THE DRAWINGS

The drawbacks of a conventional servo circuit with a failure detection mechanism and the features and advantages of a servo circuit with a failure detection mechanism according to the present invention will be more clearly understood from the following description taken in conjunction with the accompanying drawings.

DESCRIPTION OF THE PREFERRED EMBODIMENTS

Figure 1:
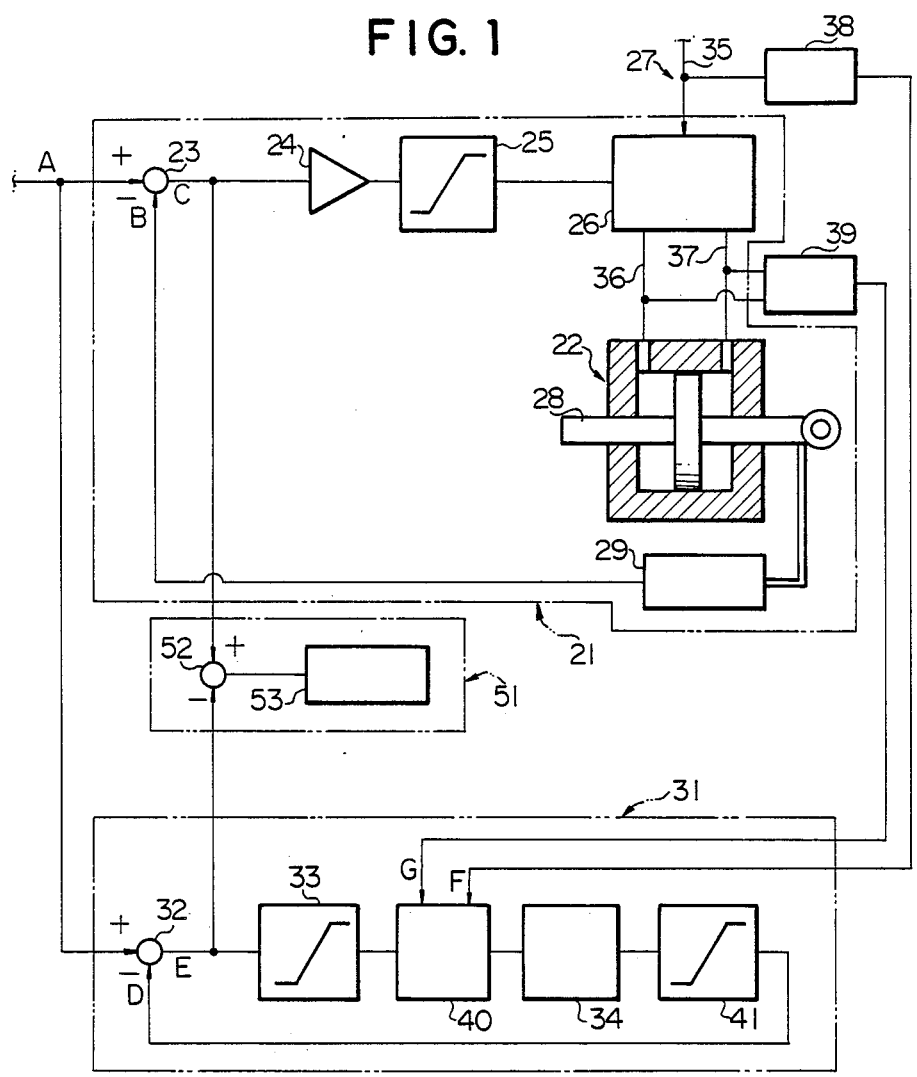
FIG. 1 is a block diagram schematically showing an embodiment of a servo circuit with a failure detection mechanism according to the invention.
Figure 2:
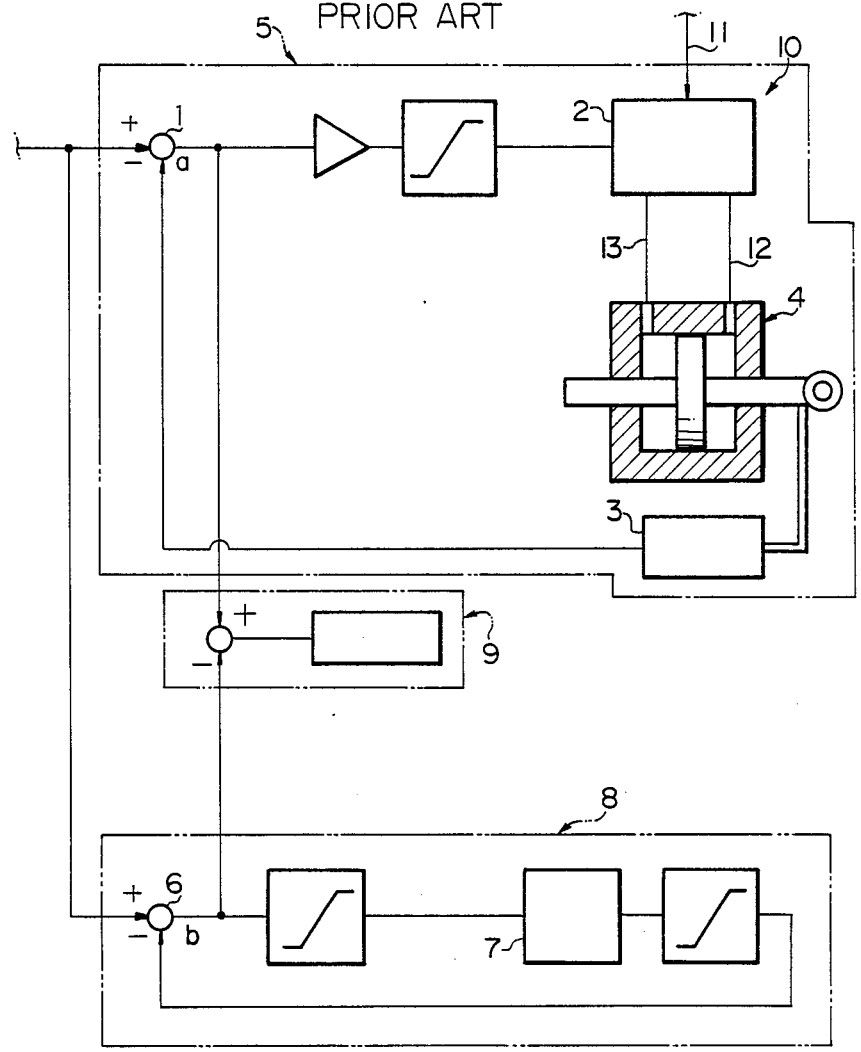
FIG. 2 is a block diagram schematically showing a conventional servo circuit with a failure detection mechanism.

Referring to FIG. 1 where the showing is for the purpose of illustrating a preferred embodiment of the invention only and not for the purpose of limiting same, a servo circuit is generally designated by reference numeral 21 and adapted to servo control an actuator 22. This servo circuit 21 includes an adder 23 wherein a target signal A and a feedback signal B to be described hereinafter are inputted. The adder 23 adds both the signals A and B together, and the result of the addition is transmitted as a control signal C from the adder 23 to an amplifier 24. After this control signal C has been amplified in the amplifier 24, it is transmitted to a servo valve 26 through a limiter 25 for protecting a circuit. The servo valve 26 is provided in a hydraulic circuit 27 communicating a source of oil pressure (not shown) with the actuator 22, and therefore if the servo valve 26 is caused to be opened and closed by the control signal C, the hydraulic circuit 27 is changed over and the actuator 22 is operated, i.e. the piston rod 28 thereof is moved. The operation of the actuator 22 is detected at all times by a detector 29 which detects a position of the piston rod 28, and the result of the detection is transmitted as the feedback signal B to the adder 23, as previously mentioned. A monitor circuit designated generally by reference numeral 31 is disposed in parallel relationship to the servo circuit 21, and includes a monitor adder 32 in which the aforesaid target signal A and a feedback signal D to be described hereinafter are inputted. This monitor adder 32 adds both the signals A and D together, and the result of the addition is transmitted as a monitor control signal E through a limiter 33 to a substitute circuit 34. The substitute circuit 34 substitutes a unitary electric circuit for the actuator 22, servo valve 26, detector 29 (in this embodiment, the amplifier 24 is also included since it is added to the servo circuit 21). That is, the substitute circuit 34 is an electric circuit having a transfer function of a constant value which composited the transfer functions of the actuator 22, amplifier 24 and servo valve 26 and detector 29. The transfer function of the servo valve 26 is expressed by an equation $K \cdot \sqrt{P-dp}$ and thus varied by the internal pressure P in a supply passage 35 between the source of oil pressure (not shown) and the servo valve 26 and the differential pressure dp between a pair of actuator control passages 36 and 37 which are disposed between the servo valve 26 and the actuator 22 (the differential pressure dp corresponds to the differential pressure between two chambers of the actuator 22). Nevertheless, the transfer function of the substitute circuit 34 assumes a constant value, and as a result the drawback included in the prior art occurs. That is, the difference between the transfer functions of the servo circuit 21 and monitor circuit 31 occurs due to the variation of the transfer function of the servo valve 26 caused by the fluctuation of the pressures P and dp, and as a result it is judged in error that the servo circuit 21 has failed. For this reason, in this embodiment, a first pressure detector 38 is provided in the supply passage 35 to detect the pressure P therein, and also a second pressure detector 39 is provided in the actuator control passages 36 and 37 to detect the differential pressure dp therebetween, so that the pressure in the hydraulic circuit 27 can be detected. The pressure signals F and G respectively from the first and second pressure detectors 38 and 39 are transmitted to a correction circuit 40 which is provided in the monitor circuit 31 between the limiter 33 and the substitute circuit 34. The correction circuit 40 computes the aforesaid equation on the basis of the values of the pressure signals F and G, and multiplies the monitor circuit 31 by the result of the computation and corrects the loop gain of the monitor circuit 31 in correspondence with the fluctuation in the loop gain of the servo circuit 21. The feedback signal D outputted from the substitute circuit 34 is transmitted to the monitor 32 through the limiter 41. Thus, the monitor adder 32, limiter 33, correction circuit 40, substitute circuit 34 and limiter 41 of the monitor circuit 31 are arranged in series so as to form a closed loop. A failure detection circuit designated generally by reference numeral 51 is adapted to compare the control signal C from the adder 23 and the monitor control signal E from the monitor adder 32 and to detect a failure of the servo circuit 21. This failure detection circuit 51 includes an adder 52 in which the aforesaid control signal C and monitor control signal E are both inputted, and a judgement circuit 53 in which the result of the addition from the adder 52 is inputted as a signal. The judgement circuit 53 judges that the servo circuit 21 has failed, if the components of the servo circuit 21, for example, the amplifier 24, servo valve 26, detector 29 and the like have failed and the aforesaid addition result becomes more than a constant value and furthermore this condition continues more than a constant time.

The operation of the embodiment mentioned above will hereinafter be described in detail.

It is assumed that the target signal A has been transmitted to the adder 23 of the servo circuit 21 and also to the monitor adder 32 of the monitor circuit 31. The adder 23 of the servo circuit 21 adds the target signal A and the feedback signal B together, and the result of the addition is transmitted as the control signal C through the amplifier 24 and limiter 25 to the servo valve 26. This servo valve 26 is then opened or closed by the amount corresponding to the result of the addition. Consequently, the hydraulic circuit 27 is switched over and the actuator 22 is operated. The operation of the actuator 22 is detected at all times by the detector 29 and the result of the detection is transmitted as the feedback signal B to the adder 23 of the servo circuit 21. In this way, the actuator 22 is servo controlled. On the other hand, the monitor adder 32 of the monitor circuit 31 adds together the target signal A and the feedback signal D which has passed through the monitor circuit 31, and the result of the addition is transmitted as the monitor control signal E to the substitute circuit 34 through the limiter 33 and correction circuit 40. This substitute circuit 34 transmits the aforesaid feedback signal D to the monitor adder 32 through the limiter 41. At this point in time, in the case there are no failures of the amplifier 24 and the like of the servo circuit 21 and furthermore there is no pressure fluctuation in the hydraulic circuit 27, the comparison result (difference) in the adder 52 of the failure detection circuit 51 becomes less than a constant value, since the value of the control signal C from the servo circuit 21 and the value of the monitor control signal E from the monitor circuit 31 are substantially equal with each other. Consequently, the judgement circuit 53 of the failure detection circuit 51 judges that the servo circuit 21 has not failed. Next, if the pressure in the hydraulic circuit 27 fluctuates, for example, the pressure within the supply passage 35 varies from P' to P and also the differential pressure between the actuator control passages 36 and 37 varies from dp' to dp, the variation of the transfer function of the servo valve 26 will be $\sqrt{P-dp}/\sqrt{P'-dp'}$ times and thereby causes the loop gain of the servo circuit 21 to vary. If pressure fluctuation occurs in the hydraulic circuit 27, the values of the pressure signals F and G from the first and second pressure detectors 38 and 39 also vary corresponding to the pressure fluctuation, since the pressure of the hydraulic circuit 27 is detected at all times by the first and second pressure detectors 38 and 39. Thereafter, these pressure signals F and G are transmitted to the correction circuit 40 of the monitor circuit 31. The correction circuit 40 computes the aforesaid equation $K\cdot\sqrt{P-dp}$ on the basis of the pressure signals F and G which have varied corresponding to the pressure fluctuation, and multiplies the monitor circuit 31 by the result of the computation. Consequently, the loop gain of the monitor circuit 31 is corrected. Therefore, even if the aforementioned pressure fluctuation occurs, there is no difference between the control signal C and the monitor control signal E and a mistaken detection of failure does not occur. On the other hand, if the components of the servo circuit 21, for example, the servo valve 26 is damaged, the difference between the control signal C and the monitor control signal E becomes more than a constant value, since the control signal C greatly varies. Furthermore, this condition continues more than a constant time, as long as the failure is not remedied. Consequently, the judgement circuit 53 judges that the servo circuit 21 has failed.

While in the aforementioned embodiment it has been illustrated and described that the correction circuit 40 is provided between the limiter 33 and the substitute circuit 34, it is noted that it may also be provided between the substitute circuit 34 and the limiter 41. In addition, although in the aforementioned embodiment the pressure of the supply passage 35 and the differential pressure between the actuator control passages 36 and 37 are both detected by the first and second pressure detectors 38 and 39, it is noted that either of the two pressures may also be detected.

From the foregoing description, it will be seen that in accordance with the present invention there is provided an improved servo circuit with a failure detection mechanism which is capable of detecting a failure of the servo circuit with high sensibility and of eliminating a mistaken detection even if there are pressure fluctuations in the hydraulic circuit of the servo circuit.

While a certain representative embodiment and details have been shown for the purpose of illustrating the invention, it will be apparent to those skilled in this art that various changes and modifications may be made therein without departing from the scope of the invention.

What we claim is:

1. A servo circuit with a failure detection mechanism comprising:
    a servo circuit for servo controlling, on the basis of a control signal, an actuator which is connected through a hydraulic circuit to a source of oil pressure, and is operated by said hydraulic circuit which is changed over by a servo valve;
    a monitor circuit arranged in parallel relationship with said servo circuit and generating a monitor control signal; and
    a failure detection circuit in which said control signal of said servo circuit and said monitor control signal of said monitor circuit are inputted and which detects a failure of said servo circuit on the basis of said control signal and said monitor control signal; wherein
    said hydraulic circuit is provided with pressure detecting means for detecting a pressure thereof; and
    said monitor circuit includes a correction circuit in which a pressure signal from said pressure detecting means is inputted and which corrects a loop gain of said monitor circuit in correspondence with a value of said pressure signal.

2. A servo circuit with a failure detection mechanism comprising:
    a servo circuit including an adder in which a target signal is inputted, a servo valve provided in a hydraulic circuit, an actuator which is connected through said hydraulic circuit with a source of oil pressure and is operated by said hydraulic circuit which is changed over by said servo valve, and a detector which detects the operation of said actuator and transmits a feedback signal to said adder, the adder transmitting a control signal to said servo valve on basis of said target signal and said feedback signal;
    a monitor circuit arranged in parallel relationship with said servo circuit and including a monitor adder in which said target signal is inputted, and a substitute circuit having a transfer function of a predetermined value which is the compound of the transfer functions of said servo valve, actuator and detector of said servo circuit, the monitor adder generating a monitor control signal on the basis of said target signal and a monitor feedback signal from said substitute circuit; and
    a failure detection circuit in which said control signal of said servo circuit and said monitor control signal of said monitor circuit are inputted and which detects a failure of said servo circuit on the basis of said control signal and said monitor control signal; wherein
    said hydraulic circuit is provided with pressure detecting means for detecting a pressure thereof; and
    said monitor circuit includes a correction circuit in which a pressure signal from said pressure detecting means is inputted and which corrects a loop gain of said monitor circuit in correspondence with a value of said pressure signal.

3. A servo circuit as set forth in claim 2, wherein said pressure detecting means comprises a first pressure detector provided in said hydraulic circuit between said servo valve and said source of oil pressure and a second pressure detector provided in said hydraulic circuit between said servo valve and said actuator.

4. A servo circuit as set forth in claim 2, wherein said correction circuit is provided between said monitor adder and said substitute circuit, and wherein the adder, correction circuit and substitute circuit are arranged in series so as to form a closed loop.

* * * * *